United States Patent
Bjorklund

[15] 3,687,253
[45] Aug. 29, 1972

[54] POWER ASSISTED CLUTCH

[72] Inventor: Elmer G. Bjorklund, Battle Creek, Mich.

[73] Assignee: Clark Equipment Company

[22] Filed: July 22, 1970

[21] Appl. No.: 57,257

[52] U.S. Cl. ............................. 192/91 A, 192/113 B
[51] Int. Cl. ..................... F16d 13/72, F16d 25/08
[58] Field of Search ............. 192/91 A, 85 CA, 113 B

[56] References Cited

UNITED STATES PATENTS

| | | |
|---|---|---|
| 3,540,557 | 11/1970 | Hasselbacher .......... 192/113 B |
| 2,158,440 | 5/1939 | Spase ..................... 192/113 B |
| 3,314,513 | 4/1967 | Lake et al. .......... 192/113 B X |
| 3,334,717 | 8/1967 | Spokas ................... 192/113 B |
| 3,474,888 | 10/1969 | Carlson et al. ......... 192/113 B |

*Primary Examiner*—Benjamin W. Wyche
*Attorney*—Kenneth C. Witt, John C. Wiessler, Robert H. Johnson and Lewis J. Lamm

[57] ABSTRACT

A power released and spring applied friction clutch having fluid powered mechanism for releasing the clutch and directing fluid onto the clutch for cooling.

5 Claims, 2 Drawing Figures

INVENTOR
ELMER G. BJORKLUND
BY Robert H Johnson
ATTORNEY

POWER ASSISTED CLUTCH

BACKGROUND OF THE INVENTION

The field of art to which this invention relates includes clutches, and more specifically fluid power released friction clutches.

In a lift truck a normal work cycle requires frequent direction reversals and engine operation at high speed while moving the truck very slowly. This necessitates not only frequent clutch disengagement, but also deliberate "slipping" of the clutch. Such operation tends to shorten clutch life and also fatigue the lift truck operator. Therefore, a principal object of my invention is to provide an improved clutch which is power assisted to disengage and utilizes the same fluid for disengagement and cooling of the clutch.

SUMMARY OF THE INVENTION

In carrying out my invention in a preferred embodiment, I provide a spring applied friction clutch having fluid powered mechanism for releasing the clutch and cooling the friction members of the clutch. The mechanism includes a stationary sleeve, a throw-out bearing assembly slidably carried by the sleeve and a collar also slidably carried by the sleeve. The sleeve, assembly and collar define a chamber to which fluid is supplied. A fluid passage communicates with the chamber and directs fluid onto the friction members of the clutch. The collar and assembly cooperate to increase the restriction to fluid flow through the chamber as the collar is moved toward the assembly, so that fluid pressure in the chamber acting on the assembly increases and causes the assembly to move in a direction to release the clutch.

The above and other objects, features and advantages of my invention will be more readily understood when the detailed description is taken in conjunction with the drawing.

DESCRIPTION OF THE PREFERRED EMBODIMENT

Figure 1:
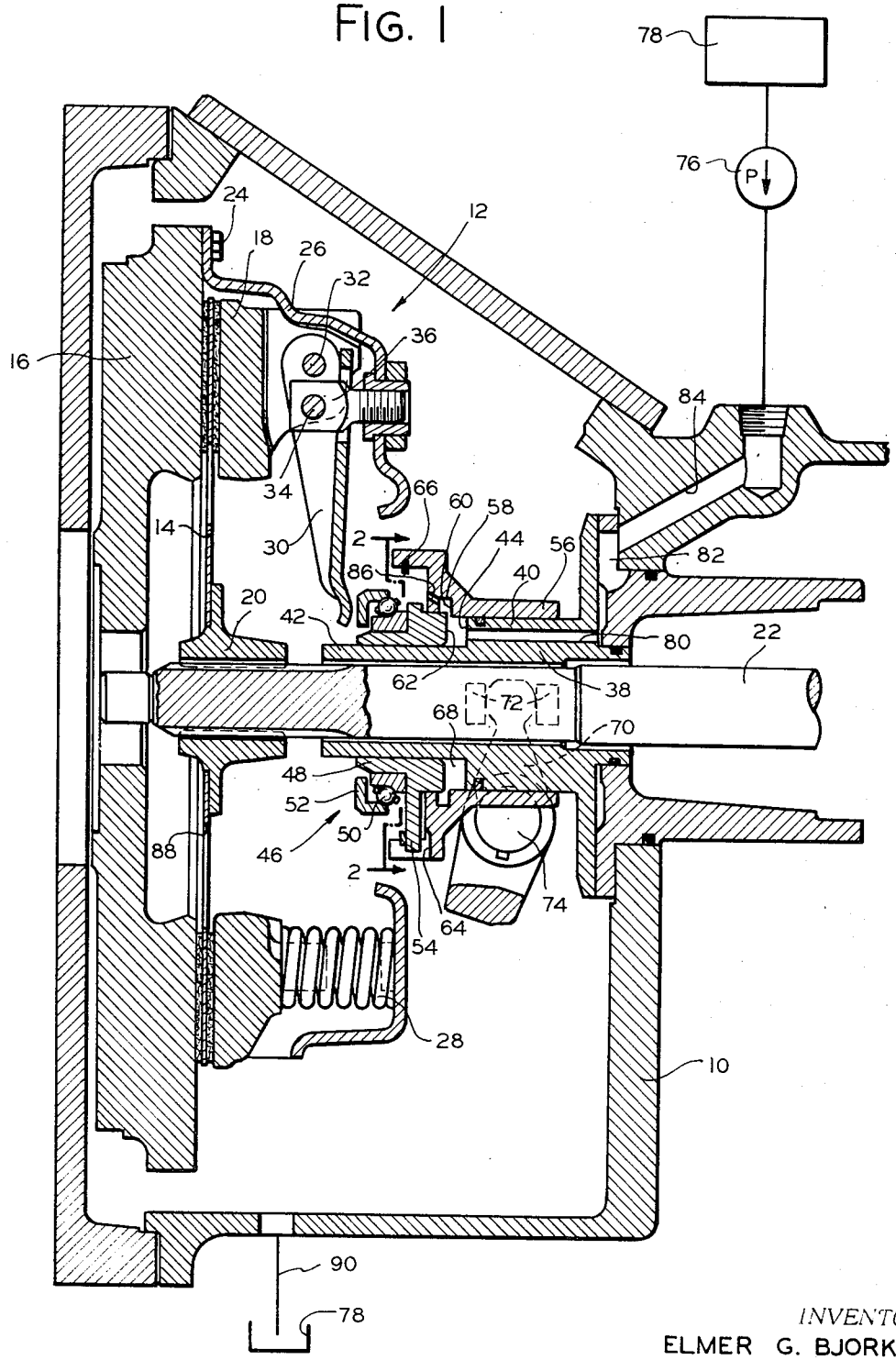
FIG. 1 is a longitudinal section of my improved clutch.
Figure 2:
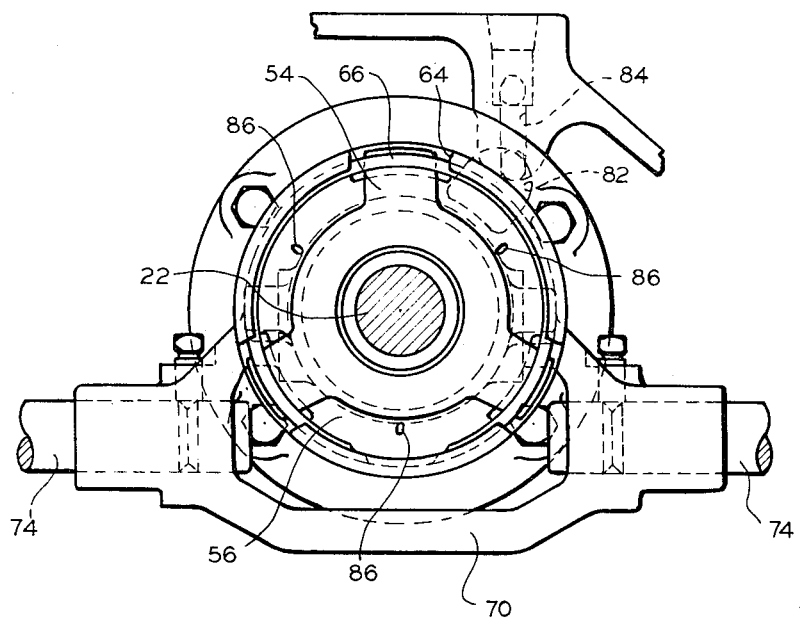
FIG. 2 is a cross-sectional view taken along line 2—2 of FIG. 1.

Referring to the drawing, the reference numeral 10 denotes generally a housing within which a clutch 12 is disposed. Clutch 12 includes a friction plate 14 that is disposed between a flywheel 16 adapted to be connected to an engine (not shown) and a pressure ring 18. Friction plate 14 has a hub 20 which is splined to an output shaft 22 that drives a transmission, not shown. Connected to flywheel 16 by any suitable means, such as a plurality of machine screws 24, is a backup and support member 26. Disposed between member 26 and pressure ring 18 is a plurality of compression springs 28 which serve to continually bias pressure ring 18 toward flywheel 16, thereby frictionally connecting plate 14 to flywheel 16 for conjoint rotation therewith.

Pivotally connected to pressure ring 18 is a plurality of lever arms 30. Each lever arm 30 is pivotally connected to pressure ring 18 at 32 and also is pivotally connected at 34 to a threaded adjustment member 36 which is carried by support and backup member 26. When the inward portion of lever arms 30 are moved toward flywheel 16 pressure ring 18 is moved away from flywheel 16 against the bias of springs 28, thereby disengaging the flywheel 16 and friction plate 14.

Mounted to housing 10 by any suitable means is a stationary sleeve 38 which has a first portion 40, a reduced diameter portion 42 and a shoulder 44. Slidably disposed on reduced diameter portion 42 is a bearing carrier assembly 46 which includes a sleeve 48 on which a ballbearing 50 is mounted. Bearing 50 includes a ring 52 which is engagable with the radially inner ends of lever arms 30. Sleeve 46 also includes three radially extending lugs 54.

Slidably disposed on stationary sleeve 40 is a collar 56 which is slidably telescoped over a portion of sleeve 48. Collar 56 includes an annular groove 58 in the wall thereof which has a side 60 that can be brought into abutment with the adjacent end 62 of sleeve 48. Sleeve 38, sleeve 48 and collar 56 define a fluid chamber 68 which includes groove 58. Also, it will be noted that lugs 54 are disposed in cutouts 64 in collar 56 and that a snap ring 66 is carried by sleeve 56 and is adapted to engage lugs 54 so as to provide a lost motion connection between sleeve 48 and collar 56.

Collar 56 is movable longitudinally on sleeve 38 by means of a yoke 70 which engages two pairs of lugs 72 on each side of collar 56. Yoke 70 is fixed to a pair of shafts 74 which are pivotally journaled in casing 10 and one of which is connected by means of linkage to a foot pedal, not shown, for manipulation by the vehicle operator.

A pump 76 draws fluid from a reservoir 78 and supplies it to chamber 68 via a fluid passage 80 in sleeve 38 which in turn communicates via a fluid passage 82 with fluid passage 84 in housing 10. At this point it will be noted that three fluid passages 86 are located in collar 56 and connect chambers 68 with the interior of housing 10. Thus, fluid supplied by pump 76 will pass through chamber 68 and hence be directed through passages 86 to spray onto friction plate 14, pressure ring 18 and, through openings 88, onto flywheel 16. This flow of oil over clutch 12 will have a cooling effect since as the oil moves over the members of the clutch its temperature will be raised and it will then drain to the bottom of housing 10 and from there via a fluid passage 90 be turned to reservoir 78.

In order to enable persons skilled in the art to better understand my invention, the operation of it will now be explained. With clutch 12 engaged, as shown in FIG. 1, fluid being supplied by pump 76 passes through chamber 68 and hence via fluid passages 86 is directed onto friction plate 14, flywheel 16 and pressure ring 18. If the operator now desires to disengage clutch 12 he manipulates yoke 70 to move collar 56 toward the left, as viewed in FIG. 1. This brings side 60 of groove 58 into closer proximity with end 62 of sleeve 48 of bearing carrier assembly 46. Thus, the resistance to fluid flow through chamber 68 is increased which causes the pressure of fluid in chamber 68 to rise. This rise in pressure increases the force being exerted against end 62 of sleeve 48, causing it to move toward the left, as viewed in FIG. 1. Leftward movement of assembly 46 brings ring 52 of bearing 50 into engagement with levers 30 and causes levers 30 to pivot about 34 so that pressure ring 18 is moved away from flywheel 16 against the bias of springs 28, thereby disengaging clutch 12. It will be noted that even during disengagement of clutch 12 that fluid flow through chamber 68 is not cut off so that there will continue to be fluid sprayed against clutch 12.

While only a single preferred embodiment of my invention has been described and disclosed in detail herein, it will be understood that various modifications and changes can be made to my invention without departing from the scope and spirit of it. Consequently, the limits of my invention should be determined from the claims.

I claim:

1. In a power assisted clutch having a first clutch member, a second clutch member, and means cooperating with said members to connect said members for conjoint rotation and disconnect said members from conjoint rotation, a fluid operated means for actuating said connecting and disconnecting means to disconnect said members and for directing fluid onto said members, comprising a stationary sleeve, said sleeve having a first portion and a second portion of reduced diameter, a bearing assembly axially slidable in operation and disposed on said second portion to engage said connecting and disconnecting means, a collar disposed to slide axially relative to said first portion, said sleeve, assembly and collar cooperating to define a fluid chamber of variable volume, first fluid passage means for supplying pressurized fluid to said chamber, second fluid passage means for directing fluid from said chamber onto said members, and means for varying the restriction to fluid flow through said chamber.

2. A clutch as set forth in claim 1 wherein said collar is slidably telescoped over said bearing assembly and includes a shoulder which cooperates with an adjacent surface of said assembly to increasingly restrict fluid flow through said chamber as said collar is moved toward said assembly.

3. A clutch as set forth in claim 1 wherein said collar and said bearing assembly are independently axially slidable in relation to said first and second sleeve portions respectively.

4. A clutch as claimed in claim 3 wherein the volume of said fluid chamber increases as said collar moves axially towards said bearing assembly and decreases as said collar moves axially away from said bearing assembly.

5. A clutch as claimed in claim 1 wherein said means for restricting fluid flow through said chamber operates to increase the restriction as the collar and bearing assembly move to increase chamber volume.

* * * * *